United States Patent [19]

Brandstätter

[11] Patent Number: 4,636,585
[45] Date of Patent: Jan. 13, 1987

[54] TELEPHONE INSTALLATIONS

[75] Inventor: Horst Brandstätter, Zirndorf, Fed. Rep. of Germany

[73] Assignee: Geobra Brandstätter GmbH & Co. KG, Fed. Rep. of Germany

[21] Appl. No.: 627,805

[22] Filed: Jul. 5, 1984

[30] Foreign Application Priority Data

Jul. 8, 1983 [DE] Fed. Rep. of Germany ....... 3324690
Nov. 15, 1983 [DE] Fed. Rep. of Germany ....... 3341251

[51] Int. Cl.$^4$ .................. H04M 5/12; H04M 9/00
[52] U.S. Cl. .................. 379/167; 379/370; 379/375; 379/422; 381/190
[58] Field of Search ........... 179/100 R, 100 D, 100 L, 179/103, 29, 37, 41 A, 81 R, 84 T; 310/320, 366

[56] References Cited

U.S. PATENT DOCUMENTS

| | | | |
|---|---|---|---|
| 1,830,035 | 11/1931 | Loeffler | 179/103 |
| 1,830,322 | 11/1931 | Hund | 310/320 |
| 2,653,192 | 9/1953 | Shipton | 179/103 |
| 3,594,515 | 7/1971 | Brown | 179/100 R |
| 3,617,923 | 11/1971 | Paradysz et al. | 310/320 |
| 3,924,073 | 12/1975 | Brandstatter | 179/100 R |
| 4,022,976 | 5/1977 | O'Brien et al. | 179/37 |
| 4,251,694 | 2/1981 | Taylor | 179/84 T |
| 4,374,307 | 2/1983 | Haagen et al. | 179/84 T |
| 4,472,602 | 9/1984 | Bordelon et al. | 179/84 T |

FOREIGN PATENT DOCUMENTS

| | | | |
|---|---|---|---|
| 2105502 | 8/1972 | Fed. Rep. of Germany ... | 179/100 R |
| 2142841 | 11/1972 | Fed. Rep. of Germany .... | 179/84 T |
| 2496366 | 6/1982 | France | 179/103 |
| 1001391 | 8/1965 | United Kingdom | 179/84 T |

Primary Examiner—Gene Z. Rubinson
Assistant Examiner—Randall P. Myers
Attorney, Agent, or Firm—Laff, Whitesel, Conte & Saret

[57] ABSTRACT

A telephone installation has two talk-listen stations each comprising a telephone case adapted to receive talking and listening means housed in a common receiver case. At least one switch is provided on the telephone case or on the receiver case and is operable as a result of the raising and setting down of the receiver case on the telephone case. Each talk-listen station has a buzzer or like means and the listening means comprises an electroacoustic piezoelectric device with metallic electrodes arranged on either side of a piezoelectric material plate, one electrode being subdivided into two partial electrodes which are not interconnected in direct current-like manner. An oscillator arrangement is provided between the partial electrodes and the other electrode which produces a dial tone in one switching position of a switch and in the other switching position one of the partial electrodes and the said other electrode form the actual listening means, the other partial electrode being disconnected.

6 Claims, 2 Drawing Figures

TELEPHONE INSTALLATIONS

FIELD OF THE INVENTION

This invention relates to a telephone installation having two talk-listen stations each comprising a telephone case adapted to receive talking and listening means housed in a common receiver case.

The invention relates both to telephone constructions, in which the dial system equipment and the associated electronics are housed in the telephone case separately from the receiver case, and in which the telephone case merely serves as a support or a mounting or hanging-up device for a receiver case, the dial system equipment and the associated electronics being housed on the latter, e.g. between the earpiece and speechpiece.

BACKGROUND OF THE INVENTION

Telephone installations of this type are used both as domestic telephones and as toys. Thus, such installations must have a robust, inexpensive construction, whilst in addition a satisfactory transmission quality must be ensured.

SUMMARY OF THE INVENTION

The object of the invention is to provide a telephone system which has a low cost price, which is easy to use and which ensures high operating reliability.

Accordingly, the present invention provides a telephone installation having two talk-listen stations each comprising talking and listening means housed in a common receiver case, switch means being provided at said receiver case, said switch means being in a first switching position when the receiver case is resting and in a second switching position when the receiver case is lifted wherein the listening means comprises an electroacoustic piezoelectric device having metallic electrodes arranged on either side of a piezoelectric material plate, one electrode being subdivided into two partial electrodes not interconnected in direct current-like manner, an oscillator arrangement being provided between the partial electrodes and the other electrode which produces a ringing signal in one switching position of a switch and in the other switching position, one of the partial electrodes and the said other electrode forming the actual listening means, the other partial electrode being disconnected.

As a result of the use of per se known piezoelectric devices as the receiver means, said components can be constructed particularly inexpensively. Through subdividing a piezoelectric device electrode into two partial electrodes, it is possible in conjunction with corresponding oscillator and amplifier means, to simultaneously use the receiver means as a buzzer, which makes mechanical components superfluous and reduces the current consumption, which is particularly significant in the case of battery operation. In addition, the expenditure on electrical components is very low.

According to a preferred embodiment, two switches are provided at each talk-listen station, one switch being in a first switching position when the receiver case is resting on the telephone case and in a second switching position when the receiver case is lifted from said telephone case, whilst the other switch is manually operable independently of the first switch, the oscillator arrangement of the in each case other talk-listen station being activated if the said one switch of said station is in the first switching position.

Preferably, when the said one switches of both talklisten stations are in the second switching position an amplifier arrangement in one talk-listen station can be activated while the other talk-listen station converts amplified electrical oscillation into sound waves.

The talking means desirably also comprises an electroacoustic piezoelectric device. Each of the piezoelectric devices at each talk-listen station may be placed on a respective taut foil in the receiver case. This arrangement makes it possible to achieve good acoustic transmission quality because the arrangement of the piezoelectric devices on a taut foil ensures that the carrier means of the piezoelectric device act as resonant cavities. It is therefore possible to use inexpensive, small piezoelectric devices with a natural frequency of approximately 3000 Hz, which per se are not suitable for speech transmission. As a result of the arrangement on the taut foil, a favourable efficiency is also obtained in the frequency range 500 to 2000 Hz.

According to an embodiment of the invention, a plurality of pushbuttons is arranged on each receiver case and on depressing the same a switch plate which is pivotably mounted in the receiver case is moved to close the switch of the associated talk-listen station. This arrangement is particularly advantageous if the telephone installation is to be used as a toy, because a child playing with it can then "dial" in accordance with the natural model and this leads to a ringing signal.

BRIEF DESCRIPTION OF THE DRAWINGS

The invention will now be further described, by way of example, with reference to the drawings, in which.

DESCRIPTION OF PREFERRED EMBODIMENT

Figure 1:
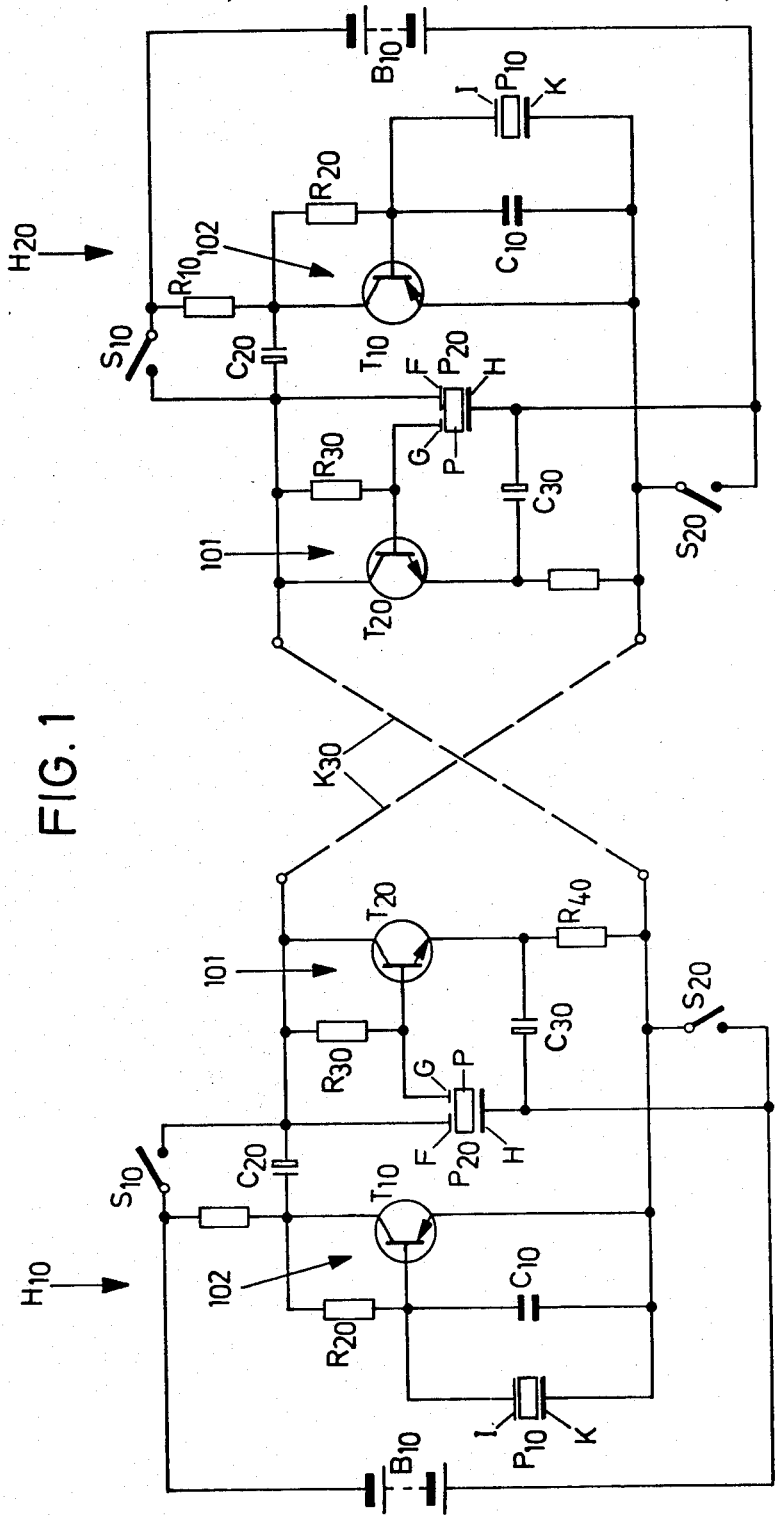
FIG. 1 is a basic circuit diagram of the electrical arrangement of a telephone installation according to the invention.

The arrangement shown in FIG. 1 comprises two identically constructed talk-listen stations $H_{10}$ and $H_{20}$, which are joined by a double conductor cable $K_{30}$. Since the two talk-listen stations $H_{10}$ and $H_{20}$ are identical in construction, the following description is limited to one of these stations. A piezoelectric device $P_{20}$ simultaneously serves as the receiver means and the buzzer. On either side of a plate P made from piezoelectric material, the piezoelectric device $P_{20}$ has electrodes H and F, G, partial electrodes F and G being separated from one another in direct current manner.

The electrode H is connected to the emitter of a transistor $T_{20}$ across a capacitor $C_{30}$ and a resistor $R_{40}$. The base of the transistor $T_{20}$ is connected to the feedback electrode G of the piezoelectric device $P_{20}$. A resistor $R_{30}$ is placed across the base and collector of the transistor $T_{20}$. A power source $B_{10}$, preferably a battery, or a transformer with rectifier, is connected to the collector of the transistor $T_{20}$ via a switch $S_{10}$. By means of the transistor $T_{20}$, an oscillator arrangement 101 is formed which, by closing the switch $S_{10}$, can in each case operate the other talk or listen station $H_{20}$ and produces via the piezoelectric device $P_{20}$ a ringing signal.

There is also a second piezoelectric device $P_{10}$ with electrodes I and K, which acts as a speech means. In order to amplify the electrical oscillations of the speech means, an amplifier arrangement 102 is provided, which essentialy comprises a transistor $T_{10}$. The base of the transistor $T_{10}$ is connected to the electrode I of the piezoelectric device $P_{10}$. A capacitor $C_{10}$ is connected between the base and emitter of the transistor $T_{10}$ and also between the electrodes I and K of the piezoelectric device $P_{10}$ and is used for suppressing high frequencies. If these high frequencies were not suppressed, they could lead to an acoustic feedback. A resistor $R_{20}$ between the base and collector of the transistor $T_{10}$ and a resistor $R_{10}$ represent the working point and stabilize the amplifier arrangement 102.

The electrode K and the emitter of the transistor $T_{10}$ are connected via a switch $S_{20}$ to the battery $B_{10}$. There is also a capacitor $C_{20}$, which is used to operate the oscillator arrangement in the in each case other talk-listen station $H_{10}$ or $H_{20}$, if the switch $S_{10}$ is not switched on and the particular receiver case is removed. It also serves to connect the amplified speech a.c. voltage from the amplifier arrangement 102, across the connecting line $K_{30}$ to the receiver means of the in each case other talk-listen station $H_{20}$ or $H_{10}$.

The capacitor $C_{30}$ represents an alternating current connection for the oscillator arrangement, the corresponding oscillator arrangement being shortcircuited when the receiver case is removed.

When the receiver case is placed on the telephone case, the switches $S_{20}$ are open and on removing the receiver case are closed. Thus, a telephone communication is possible, if both receiver cases are removed.

When the receiver case is placed on the telephone case, switches $S_{20}$ are open, so that no telephone communication can take place. If one of the ringing keys $S_{10}$ is closed, the oscillator arrangement of the in each case other talk-listen station $H_{10}$ or $H_{20}$ is supplied with power, i.e. a ringing signal is heard through the formation of a resonant circuit across the electrodes G, H and F of the piezoelectric device $P_{20}$.

Figure 2:
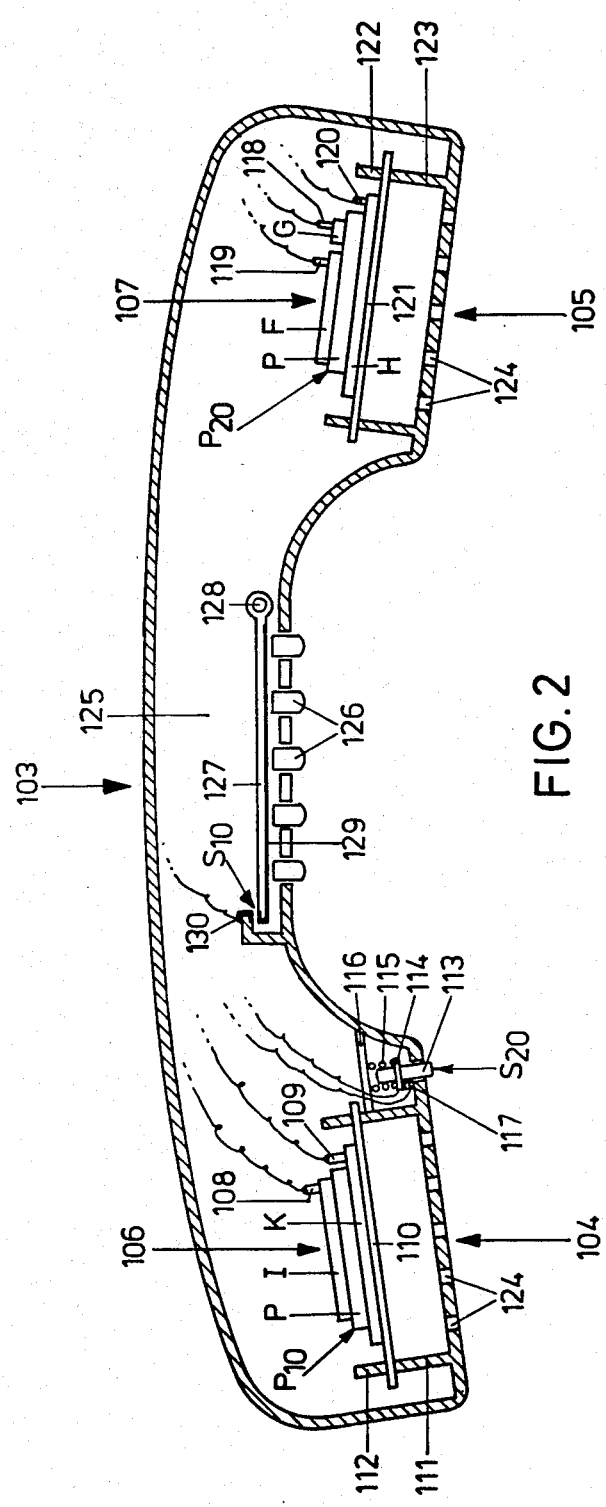
FIG. 2 a diagrammatic section through one embodiment of a receiver case with talking and listening means according to the invention.

FIG. 2 shows a receiver case 103, the electrical connections of the individual means not being shown. The receiver case 103 comprises a so-called speechpiece 104 and an earpiece 105 in which are provided a speech means 106 and a listening means 107.

The speech means 106 essentially comprises a piezoelectric device $P_{10}$, which is formed by a plate of piezoelectric material P, which is coated on either side by electrodes I and K. Solder points 108 and 109 are provided on electrodes I and K and are used for connecting the electrical lines.

The piezoelectric device $P_{10}$ is fixed to a foil 110, which is stretched between two cylindrical segments 111, 112, the cylindrical segment 111 being connected to the receiver case 103.

The switch $S_{20}$ is also placed on the speechpiece 104. Switch $S_{20}$ comprises a portion 113 which projects over the receiver case 103 and which carries a contact collar 114. The latter is pressed against a contact 117 in the closed position by a helical spring 115, which engages with a case-fixed partition 117. If the receiver case 103 is placed on the telephone case, a force acts against the portion 113 and the switch $S_{20}$ is opened. On raising the receiver case 103 the force of the spring 115 comes into effect and the switch $S_{20}$ is closed.

The listening means 107 also comprises a piezoelectric device $P_{20}$, which is once again formed by a plate of piezoelectric material P to either side of which are fixed electrodes H and F, G. The electrode F, G, is subdivided into two partial electrodes F and G. Each electrode F, G, H carries a solder point 118, 119, 120 for the connection of lines.

The piezoelectric device $P_{20}$ is once again fixed to a foil 121, which is stretched between two cylindrical segments 122, 123, the cylindrical segment 123 being fixed to the speechpiece 105.

Openings 124 on the earpiece 105 and the speechpiece 104 make the receiver case 103 acoustically transparent.

Pushbuttons 126 are arranged on the middle portion 125 of the receiver case 103 serving as a handle. Below the pushbuttons 126 a switch plate 127 is pivotably mounted about a spindle 128 which has a contact side 129, which is forced into an inoperative position by a spring. Through the operation of a pushbutton 126, the switch plate 127 is pivoted about the spindle 128 out of its inoperative position and is pressed against a contact 130. In this way, the thus formed switch $S_{10}$ is closed.

What is claimed is:

1. A telephone installation having two talk-listen stations each comprising talking and listening means housed in a common receiver case, first switch means being provided, at said receiver case, said first switch means being in a first switching position when the receiver case is resting and in a second switching position when the receiver case is lifted wherein the listening means comprises an electroacoustic piezoelectric device having metallic electrodes arranged on either side of a piezoelectric material plate, one electrode being subdivided into two partial electrodes not interconnected in direct current-like manner, an oscillator arrangement being provided between the partial electrodes and the other electrode which produces a ringing signal in one switching position of said first switch means and in the other switching position, one of the partial electrodes and the said other electrode forming the actual listening means, the other partial electrode being disconnected.

2. A telephone installation as claimed in claim 1, in which a second switch means is provided at each talk-listen station, said second switch means being manually operable independently of the first switch means, the oscillator arrangement of the remote talk-listen station being activated if the said first switch means of said station is in the first switching position.

3. A telephone installation as claimed in claim 2, in which, when the said first switch means of both talklisten stations are in the second switching position an amplifier arrangement in one talk-listen station can be activated while the other talk-listen station converts amplified electrical oscillation into sound waves.

4. A telephone installation as claimed in claim 1, in which the talking means comprises an electroacoustic piezoelectric device.

5. A telephone installation as claimed in claim 4, in which each of the piezoelectric devices at each talk-listen station is placed on a respective taut foil in the receiver case.

6. A telephone installation as claimed in claim 1, in which a plurality of pushbuttons is arranged on each receiver case and on depressing the same a switch plate which is pivotably mounted in the receiver case is moved to close said second switch means of the associated talk-listen station.

* * * * *